United States Patent
Vogel et al.

(10) Patent No.: US 10,794,001 B2
(45) Date of Patent: Oct. 6, 2020

(54) ROTARY FEEDER WITH RECESS FOR PROTECTIVE BAFFLE AND SHEAR EDGE ASSEMBLY

(71) Applicant: Andritz Inc., Glens Falls, NY (US)

(72) Inventors: Keith Vogel, Queensbury, NY (US); Christopher George Fitzgerald, Queensbury, NY (US); Richard M. Grogan, Queensbury, NY (US)

(73) Assignee: Andritz Inc., Alpharetta, GA (US)

( * ) Notice: Subject to any disclaimer, the term of this patent is extended or adjusted under 35 U.S.C. 154(b) by 719 days.

(21) Appl. No.: 14/950,436

(22) Filed: Nov. 24, 2015

(65) Prior Publication Data

US 2016/0168789 A1 Jun. 16, 2016

Related U.S. Application Data

(60) Provisional application No. 62/091,917, filed on Dec. 15, 2017.

(51) Int. Cl.
*D21B 1/02* (2006.01)
*D21B 1/00* (2006.01)
(Continued)

(52) U.S. Cl.
CPC ........... *D21B 1/02* (2013.01); *B65G 53/4633* (2013.01); *D21B 1/00* (2013.01)

(58) Field of Classification Search
CPC ............................. B65G 53/4633; B65G 29/02; B65G 2201/04; D21B 1/02; D21B 1/00
(Continued)

(56) References Cited

U.S. PATENT DOCUMENTS 3,118,575 A * 1/1964 McCauley ........... A01K 5/0275
222/349
3,151,784 A * 10/1964 Tailor ................. B65G 53/4633
222/368
(Continued)

FOREIGN PATENT DOCUMENTS

CA 2589323 8/1999
CN 101857130 10/2010

OTHER PUBLICATIONS

Inlet definition and meaning_Collins English Dictionary, retrieved date Jan. 22, 2020.*
(Continued)

*Primary Examiner* — Adam J Eiseman
*Assistant Examiner* — Mohammed S. Alawadi
(74) *Attorney, Agent, or Firm* — Robert J. Hornung (57) ABSTRACT

According to an aspect of the invention, a rotary feeder for transferring comminuted fibrous material is provided having as components: a rotary feeder housing, having at least one inlet opening for receiving material (chips) and at least one opening for discharging material (chips), and an internal shear edge assembly adjacent the inlet; wherein a protective baffle (doctor blade) is adjacent to the shear edge assembly; a rotor, rotatably mounted with the rotary feeder housing and having pockets for accepting material introduced to the rotary feeder housing; and a power source which rotates the rotor in said housing; and wherein the rotary feeder housing has a recess along the length of the rotor in the inlet at an exit end of the inlet, the recess being of sufficient size to allow the shear edge assembly and doctor blade to sit within the recess.

14 Claims, 4 Drawing Sheets

(51) Int. Cl.
  *B65G 53/46* (2006.01)
  *B65G 29/02* (2006.01)
(58) Field of Classification Search
  USPC ........................................................ 241/242
  See application file for complete search history.

(56) References Cited

U.S. PATENT DOCUMENTS

| | | | | |
|---|---|---|---|---|
| 4,028,779 A * | 6/1977 | Shah | ..................... | B02C 18/148 226/5 |
| 4,155,562 A * | 5/1979 | Kiuchi | ............... | B65G 53/4633 277/345 |
| 4,268,205 A * | 5/1981 | Vacca | ................ | B65G 53/4633 222/368 |
| 4,465,239 A * | 8/1984 | Woten | .................... | B65G 53/46 241/159 |
| 4,823,993 A * | 4/1989 | Siegel | ................ | B65G 53/4633 222/345 |
| 5,044,837 A * | 9/1991 | Schmidt | ............. | B65G 53/4633 406/128 |
| 5,472,305 A * | 12/1995 | Ikeda | ..................... | B29B 17/02 222/368 |
| 5,772,081 A * | 6/1998 | Wei | .................... | B65G 53/4633 222/368 |
| 5,913,458 A * | 6/1999 | Eriksson | ................. | F16K 31/54 162/246 |
| 6,032,884 A | 3/2000 | Bowling | | |
| 6,237,816 B1 * | 5/2001 | Boritzki | ............. | B65G 53/4633 222/1 |
| 6,471,447 B1 * | 10/2002 | Salley | ................ | B65G 53/4633 406/64 |
| 8,240,588 B2 * | 8/2012 | Muller | ............... | B65G 53/4633 241/224 |
| 2003/0215293 A1 * | 11/2003 | Prough | .............. | B65G 53/4633 406/63 |
| 2004/0065857 A1 * | 4/2004 | Cheng | ................ | B65G 65/4881 251/129.13 |
| 2010/0282888 A1 * | 11/2010 | Pallmann | ............ | B02C 18/18 241/278.1 |
| 2013/0277399 A1 * | 10/2013 | Zinser | ................ | B65G 53/4633 222/368 |

OTHER PUBLICATIONS

Tube definition and meaning_Collins English Dictionary, retrieved date Jan. 22, 2020.*
Patricio Hess Sandrock, Patent Examination Report, dated May 17, 2017, Chilean Patent Office, Chile.

* cited by examiner

ROTARY FEEDER WITH RECESS FOR PROTECTIVE BAFFLE AND SHEAR EDGE ASSEMBLY

CROSS-RELATED APPLICATION

This Application is a non-provisional application claiming the benefits of U.S. provisional patent application Ser. No. 62/091,917 filed Dec. 15, 2014, the entirety of which is incorporated herein by reference.

BACKGROUND

Technical Field

The disclosure relates generally to rotary feeders configured to convey material from one vessel to another, or from one set of process conditions to a second set of process conditions. More particularly, the disclosure relates to rotary feeders configured to transfer cellulosic material and biomass between process stages in industries such as the pulp and paper industry and lignocellulosic biochemical or biomass processing industries.

Related Art

In the pulping industry, rotary feeders are often used to convey material, for example, wood chips, or other types of comminuted cellulosic fibrous material, from one vessel to another vessel, or from one set of process conditions to another set of process conditions. The first set of process conditions may have a lower pressurized state than the pressurized state of the second set of process conditions.

Conventional rotary feeders typically have a rotor mounted for rotation within a cylindrical housing. The rotor may be generally cylindrical. Two or more pockets or cavities may be disposed in the body of the rotor. The rotary feeder housing usually contains two or more openings or ports that accept chips under a first set of process conditions. As the rotor rotates, these pockets or cavities rotate into communication with openings in the rotary feeder housing. A first set of process conditions may include a first pressure and a first temperature. The chips, once accepted into the inlet opening of the rotary feeder housing, are then transferred by rotation to the rotary feeder housing discharge outlet. Typical rotary feeders may include an airlock feeder, chip meter, low pressure feeder, or high pressure feeder, among other types of devices.

Because rotary feeders are designed to transfer material from one set of process conditions to another, the rotary feeders are also designed to isolate the process conditions. That is, rotary feeders are designed to prevent leakage of liquids, solids and gasses, between one set of process conditions and another set of process conditions. For this reason, the radial clearance (e.g. a space or opening) between the outer surface of the rotor and the internal surface of the rotary feeder housing. The outer surface of the rotor may generally define a rotor outer diameter. The internal surface of the rotary feeder housing may generally define an internal diameter. The radial clearance is closely monitored and controlled to ensure as little leakage as possible during operation of the rotary feeder. The maximum radial clearance may not exceed a desired dimension.

Continuous operation of the rotary feeder makes maintaining tight radial clearances difficult. Chips and tramp material tend to have abrasive surfaces that can wear away the surfaces that define the radial clearance between the rotor and the rotary feeder housing. The chip material being transferred may be, for example, hardwood or softwood chips or other comminuted cellulosic material, in a dry, steamed or slurried state. The chip material may further include tramp material. Tramp material may be stones, sand, dirt, nuts, and bolts mixed with the chips.

The surfaces of both the rotor and the rotary feeder housing, especially the shear edge exposed to the inlet openings in the rotary feeder housing, can become worn or damaged during operation. This damage can increase the radial clearance between the rotor and rotary feeder housing surfaces and result in increased leakage of process fluids, gasses, or solids. Damaged surfaces or debris can also increase the friction between the rotor and rotary feeder housing surfaces and result in increased electrical loads on the motor or drive train turning the rotor.

In conventional rotary feeders, the leading internal edge of the rotary feeder housing confronts the chip material as the chip material exits in inlet. The chips and tamp material accumulate in the pocket exposed to the inlet. The chips and tramp material generally overfill the pockets. That is, chips extend beyond the rotor surface that define the pocket. As the pocket rotates downwardly under the internal surface of the rotary feeder housing, the leading internal edge on the rotary feeder housing cuts chips and tamp material that overfill the pocket and thereby reduces the amount of chips and tamp material lodged within the radial clearance. This edge may be referred to as a "shear edge". A shear edge is typically designed and cast as a part of the rotary feeder housing and then monitored to minimize the possibility of chip material entering the radial clearance between the outer surface of the rotor and internal surface of the rotary feeder housing.

A shear edge, with an attached doctor blade, may extend into the flow of the chips entering the rotary feeder housing. As the chips flow through the inlet of the rotary feeder housing and into the rotor pockets, the chips move past the shear edge and attached doctor blade extending into the flow of the chips. As the chips flow past the shear edge and doctor blade, the doctor blade cuts some of the chips and may obstruct the flow of the chips.

The chips that are cut are thereby broken into small pieces. These small pieces may become lodged in the rotor or may be too small to be utilized effectively in downstream processing. Small chips can be difficult to process, either by Kraft cooking or other processes used to produce pulp from chips. Small chips may flow through the system untreated or under treated. If untreated or under treated, the small pieces may require removal or recirculation. Operators may remove the small chips from the process, treat the small chips, and recirculate the small chips through the process to produce pulp. Untreated or under treated small pieces removed from the system can result in lower product yield.

Manufacturers generally cast rotary feeder housings by pouring molten metal into a mold. This method has placed some limitations on the design and shape of the rotary feeder housing. Prior castings have limited the cast piece (in this case the rotary feeder housing) to relatively few distinct sections, with gradual changes in shape. Currently, a doctor blade and a shear edge are placed in the inlet of the rotary feeder housing. The inlet is the region where chips enter the rotary feeder.

SUMMARY OF INVENTION

To reduce or eliminate the cutting of chips as the chips enter a rotary feeder, and to reduce linear pressure of the chips against the shear edge, the present invention describes a recess for the shear edge assembly or doctor blade or both the shear edge assembly and doctor blade in the rotary feeder housing. The shear edge assembly may include multiple shear edge plates adjacent each other and a shear edge block, with the shear edge block being adjacent and may be fastened to the rotary feeder housing interior surface.

The shear edge assembly, doctor blade, or both the shear edge assembly and doctor blade may be located in the recess of the rotary feeder housing such that a tip of the shear edge assembly comprises an edge configured to cut chips and wherein the tip of the shear edge assembly remains in the recess such that the tip of the shear edge assembly does not extend into the inlet. In this manner, the present disclosure may allow the chips to flow from the rotary feeder inlet and fill the rotor pocket without being cut by the doctor blade prior to entering the rotor pocket. Locating the shear edge assembly within the recess may reduce wear of the shear edge assembly and improve protection of the rotary feeder housing interior surface and the outer surface of the rotor.

The recess is configured to house a shear edge assembly. In still other exemplary embodiments the recess may be configured to house both the shear edge assembly and the doctor blade. In other exemplary embodiments, the recess may be configured to house a doctor blade. Fasteners may engage the doctor blade and shear edge assembly to the rotary feeder housing. In still other exemplary embodiments, the doctor blade may be absent. By placing the doctor blade in the recess of the rotary feeder housing, the doctor blade is positioned to protect the shear edge assembly from damage and to reduce or eliminate the cutting of chips as the chips pass the recess where the doctor blade is located.

In other exemplary embodiments, the doctor blade may be placed outside the recess while having the shear edge assembly placed within the recess. When the doctor blade is not placed within the recess, the recess provides protection for the shear edge assembly. The shear edge assembly can provide protection for the outer surface of the rotor and the interior surface of the rotary feeder housing.

For the sake of illustration, "wood chips" or "chips" will be used throughout this discussion, although it is to be understood that other comminuted cellulosic fibrous material may be used in the practice of the invention, for example, hardwood, softwood, sawdust, straw, grasses, stover, bagasse, and other cellulosic fibrous material.

Applicant has discovered that by extending the shear edge and doctor blade into the rotary feeder inlet, a narrowing of the exit end of the inlet occurs. This narrowing results in a reduction in actual inlet flow space and may result in the cutting of chips as they flow past the doctor blade and shear edge. Applicant has discovered that it is desirable to remove one or both of the shear edge and the doctor blade from in the rotary feeder inlet to reduce or eliminate the narrowing of the inlet and the resulting cutting of the chips. Additionally, it is desirable to provide a location for the shear edge so as to allow for pressure release of the chip flow and improve protection of the rotary feeder housing interior surface and the outer surface of the rotor surface. Providing a recess where the doctor blade and the shear edge could be located would allow the identified shortcomings to be overcome.

Without being bounded by theory, locating the shear edge assembly within the recess may provide protection for the shear edge assembly by increasing the linear distance between the chip flow in the rotary feeder inlet and the shear edge assembly. The linear distance is a line, perpendicular to the direction of the chip flow, between the flow of chips in the rotary feeder inlet and the shear edge assembly surface. As the chips flow through the rotary feeder inlet, the chips exert pressure on the solid surfaces the chips encounter. For example, the chips exert pressure on the wall of the rotary feeder housing at the rotary feeder inlet, and at the shear edge. By increasing the linear distance between the rotary feeder inlet and the shear edge assembly, an exemplary rotary feeder apparatus may reduce the pressure exerted by the chips on the shear edge assembly. The lower pressure experienced by the shear edge assembly may reduce damage to the shear edge assembly and provide increased protection for the outer surface of the rotor and the interior surface rotary feeder housing. Reducing damage to the shear edge assembly (and therefore the outer surface of the rotor and the interior surface of the rotary feeder housing) prevents an increase in the radial clearance between the outer surface of the rotor and the interior surface of the rotary feeder housing. In certain exemplary embodiments, the doctor blade may be omitted when the shear edge assembly is located within the recess.

DETAILED DESCRIPTION OF THE DRAWINGS

The following detailed description of the preferred embodiments is presented only for illustrative and descriptive purposes and is not intended to be exhaustive or to limit the scope and spirit of the conceived system. The embodiments were selected and described to best explain the principles of the conceived system and its practical application. A person of ordinary skill in the art will recognize many variations can be made to the conceived system disclosed in this specification without departing from the scope and spirit of the conceived system. In all figures, the same or compatible parts have the same reference number where possible.

Figure 1:
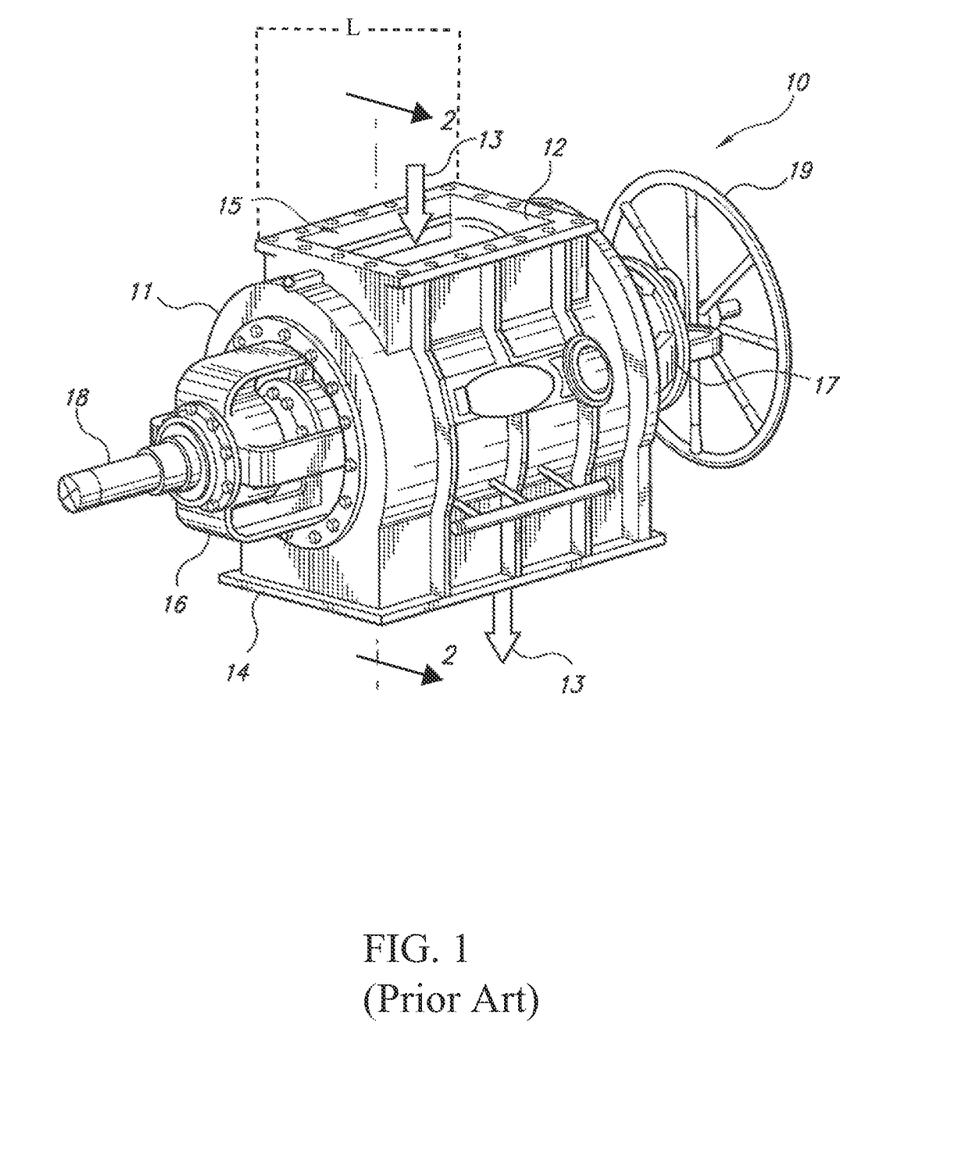
FIG. 1 is an isometric view of a rotary feeder.
Figure 2:
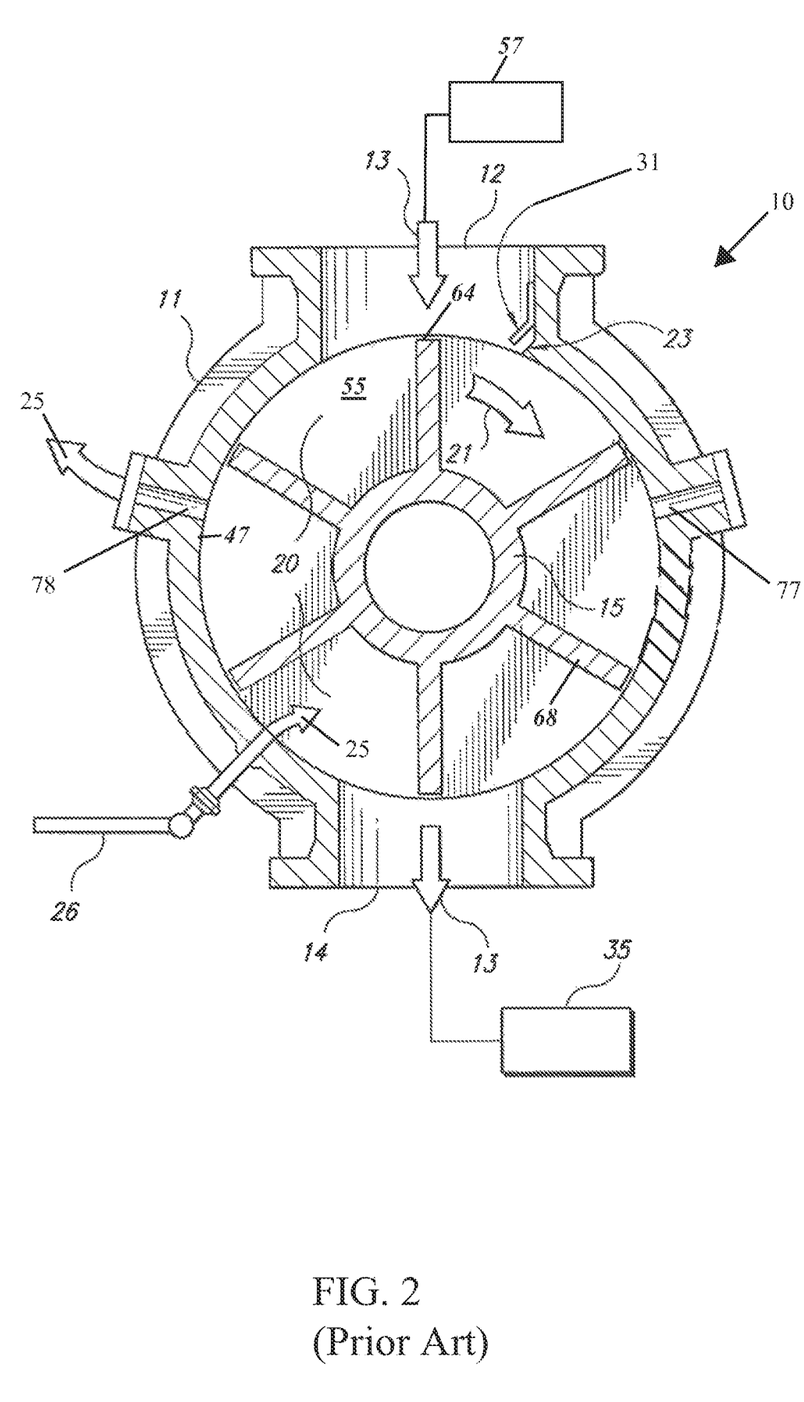
FIG. 2 is a schematic cross sectional view of FIG. 1 taken along lines 2-2 showing a conventional shear edge and conventional doctor blade.

FIG. 1 illustrates an isometric view of one type of rotary feeder 10. The rotary feeder 10 shown is a low pressure feeder ("LPF"). The rotary feeder 10 has a rotary feeder housing 11, having an inlet 12, for chips 13, a discharge outlet 14, and a rotor 15 (FIG. 2). The rotary feeder housing 11 has an internal surface 47 defining a chamber 55 (FIG. 2). The chamber 55 receives a rotor 15. The rotor 15 disposed within the chamber 55 is rotatably supported in bearing housings 16, 17, and is driven by drive journal 18, which is in turn powered by a power source, such as an electric motor (not depicted).

Figure 3:
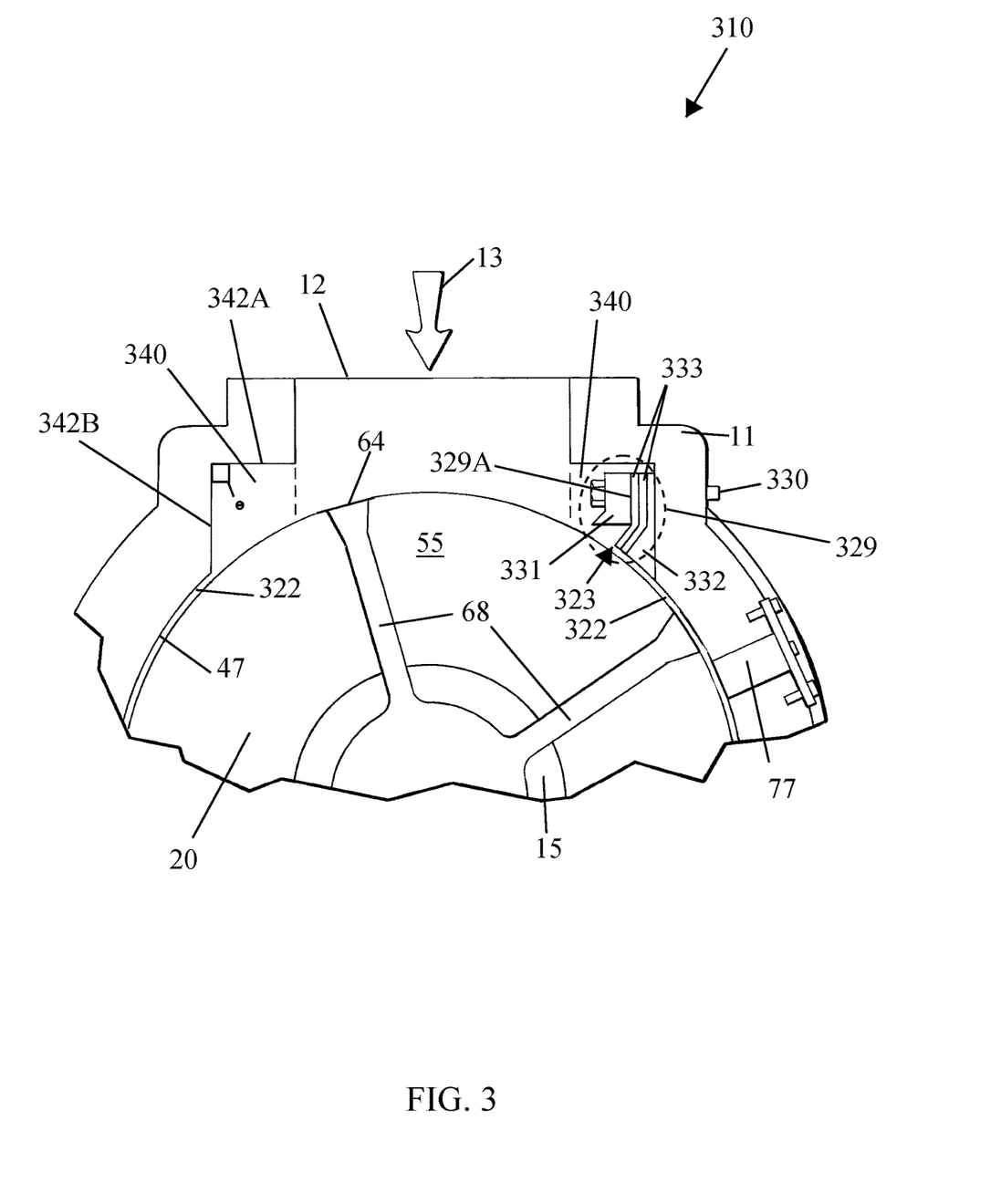
FIG. 3 is a schematic cross sectional view of a rotary feeder in accordance with an exemplary embodiment of the invention.

FIG. 2 is a schematic cross sectional view of the feeder 10 taken through section line 2-2 in FIG. 1. The rotor 15 has multiple rotor blades 68 defining pockets 20 configured to receive chips 13. The rotor blades 68 have an outer surface 64. In other configurations, the outer surface 64 may be a cylindrical plate attached to the top of rotor blades 68. The outer surface 64 and the internal surface 47 of the rotary feeder housing 11 define a radial clearance 322 (FIG. 3).

The rotor 15 and the internal surface 47 of the rotary feeder housing 11 are typically complementarily tapered. Tapering of both the rotary feeder housing 11 internal surface 47 and the rotor 15 allows the rotor 15 to be axially moved in the rotary feeder housing 11 so that the radial clearance 322 between the rotor 15 and the internal surface 47 of the chamber 55 can be adjusted, especially after wear has occurred to either the outer surface 64 or the internal surface 47 or both during operation. Operators typically adjust the rotor 15 axially by turning hand wheel 19. Hand wheel 19 rotates a threaded shaft (not depicted) which axially moves the rotor 15 in the rotary feeder housing 11 as desired.

In operation, chips 13 fall into inlet 12, typically from a vessel 57 above. This vessel 57 may simply be a retention vessel, for example, a chip bin, or treatment vessel. There may also be a conveying or metering device immediately above inlet 12, such as a screw conveyor, plug-type feeder, or a chip meter. The prevailing pressure at the inlet 12 may vary from 0-1 bar (0-15 psi) gauge. In other operating conditions, a slight vacuum may exist.

FIG. 2 further illustrates a sharply profiled "shear edge" 23. The shear edge 23 typically has a sharp contour to shear chip material carried by the pocket 20 of the rotor 15 into the rotary feeder housing 11. The shear edge 23 may further cut chips 13 as the chips 13 fall through the inlet 12. Typically, manufacturers cast the shear edge 23 with the rotary feeder housing 11. The internal surface 47 of the rotary feeder housing 11 is machined to provide the desired radial clearance 322 between the outer surface 64 and the internal surface 47 of the rotary feeder housing 11. The shear edge 23 may be machined when the internal surface 47 of the rotary feeder housing 11 is machined to ensure a sharp, clean contour and to further define the desired radial clearance 322.

To protect the shear edge 23 from falling chips 13, rotary feeders 10 may additionally include a protective baffle positioned before or above the shear edge 23 to prevent large particles or chips 13 from impacting and damaging the shear edge 23. This protective baffle, is typically referred to as a "doctor blade" 31 (although this baffle does not act as a doctor blade used to remove pulp from a rotating drum cylinder). The doctor blade 31 is welded or otherwise fastened separately to the inlet 12 in the rotary feeder housing 11. In this disclosure, the terms "protective baffle" and "doctor blade" 31 are used interchangeably and refer to the same piece of equipment.

It is possible for the doctor blade 31 to be attached to the shear edge 23 by fasteners to allow for quick removal of worn or damaged doctor blades 31 as described in U.S. Pat. No. 6,032,884, the entirely of which is incorporated herein by reference. The fasteners may be threaded or not threaded or be of other suitable arrangements to meet the purpose of a fastener.

After the chips 13 fall past the doctor blade 31 and shear edge 23, the chips 13 land in one or more pockets 20. These pockets 20 move with the rotor 15 and gradually transfer the chips 13 from the inlet 12 to the discharge outlet 14. Whereas the inlet 12 may be exposed to atmospheric pressure or operate at a slight vacuum, the discharge outlet 14 may be pressurized to a greater degree than the inlet 12. The rotor 15 turns in the direction of arrow 21.

As the pockets 20 fill with chips 13 the volume of the chips 13 generally exceeds the volume of the pocket 20. As a result, a portion of the chips 13 extend beyond the outer surface 64. As a filled pocket 20 rotates in the direction of arrow 21, the filled pocket 20 passes under the shear edge 23. As the filled pocket 20 passes under the shear edge 23, the shear edge 23 shaves off the tops of the chips 13 to prevent the chips 13 from interrupting the rotor's rotation. The doctor blade 31 deflects large chips 13 or tramp material from impinging on the shear edge 23. In this manner, the shear edge 23 limits the volume of chips 13 entering the rotary feeder's 10 process transition zones.

The radial clearance 322 is shown between the outer surface 64 of the rotor 15 and the inner surface 47 of the rotary feeder housing 11. The radial clearance 322 typically varies from 0.003 inches to 0.025 inches. FIG. 2 illustrates a typical arrangement for preventing damage to the rotary feeder housing 11 and to prevent chips 13 from lodging between the rotor 15 and rotary feeder housing 11. A typical arrangement includes the sharply profiled shear edge 23, and the doctor blade 31. Once past the shear edge 23, chips 13 are transferred by rotor 15 to the discharge outlet 14 of the rotary feeder housing 11. The chips 13 may extend into this radial clearance 322 and thereby contribute to creating an air-tight seal between the inlet 12 and the discharge outlet 14. Gravity discharges the chips 13 at the discharge outlet 14. Conduit 26 may introduce a steam 25 to purge the pocket 20 of remaining chips 13 and thereby assist this discharge.

The chips 13 are typically discharged to another vessel 35 for retention or for further treatment. The vessel 35 (connected to discharge outlet 14) may be a conveying and treatment vessel, for example, a steaming vessel, or the vessel 35 may be chip chute or chip tube. This vessel 35 may be unpressurized, but typically pressure is maintained in the vessel 35, for example, a pressure of from about 0.5 to 3 bar (7 to 45 psi) gauge. The prevailing conditions in the discharge outlet 14 of the rotary feeder 10 are isolated and are prevented from leaking to the inlet 12 by the mass of chips 13 being conveyed, and by the close radial clearance 322 between the rotor 15 and the rotary feeder housing 11. Excess fluid such as steam 25 may be discharged from feeder exhaust ports 77, 78 as the pocket 20 rotates on the pocket's 20 return to the inlet 12.

FIG. 3 is a schematic cross sectional view of a rotary feeder 310 in accordance with one embodiment of the invention. It is to be understood that although a low pressure feeder ("LPF") is used to illustrate a particular embodiment of the present disclosure, the disclosure can be used in rotary feeders 310 configured to convey comminuted cellulosic fibrous material. Chips 13 enter the inlet 12 of the rotary feeder 310. In accordance with one embodiment, a recess 340 has been formed in the rotary feeder housing 11. The recess 340 appears as a "notch" in the rotary feeder housing 11 and is of sufficient size to allow the shear edge assembly 329 to be inside the recess 340. An inner wall 342 of the rotary feeder housing 11 defines the recess 340. The inner wall 342 may be co-extensive with the inner surface 47 that defines the chamber 55. In FIG. 3, the inner wall 342 comprises a top inner wall 342A and a first inner side wall 342B. It will be understood that exemplary embodiments may utilize multiple inner walls 342. The top inner wall 342A is disposed at a right angle θ to the first inner side wall 342B. In other exemplary embodiments comprising multiple inner walls 342, the inner walls 342 may be disposed at obtuse angles relative to at least one adjacent inner wall 342. In other exemplary embodiments, the inner wall 342 may be curved. Combinations of the inner wall embodiments are considered to be within the scope of this disclosure. Recess 340 may be provided on either side of the rotary feeder housing 11, either side of the inlet 12 at the downstream end of the inlet 12.

A shear edge assembly 329 may be located within the recess 340. The shear edge assembly 329 may comprise a shear edge block 332. A fastener 330 may engage the shear edge block 332 to the first inner side wall 342B. In other exemplary embodiments, the shear edge block 332 may be an integral component in the rotary feeding housing 11. The shear edge block 332 is generally machined such that the tip 323 of the shear edge block 332 operates as an edge when the surface of the shear edge block 332 is exposed to chips 13. The edge cuts chips 13 the edge contacts. A shear edge assembly 329 may further comprise shear edge plates 333 stacked against each other. The shear edge plates 333 may be disposed on the shear edge block 332.

A fastener 330 may engage the shear edge plates 333 to the shear edge block 332. The tip 323 of the shear edge plate 333 that is exposed to the chips 13 operates as an edge. As the shear edge plates 333 become worn, operators may remove the outermost shear edge plate 333 to expose an adjacent shear edge plate 333 or the shear edge block 332. A fastener 330 may engage a doctor blade 331 to the shear edge assembly 329. In this exemplary embodiment, neither the doctor blade 331 nor the front of the shear edge assembly 329 extends beyond the recess 340 and into the inlet 12.

The doctor blade 331 is disposed within the recess 340 adjacent to the shear edge assembly 329. The doctor blade 331 is disposed between the shear edge assembly outer surface 329A and the inlet 12 or exit end within the recess 340. The exit end of the inlet 12 is the point at which chips 13 first encounter the recess 340. Usually, only one recess 340 is used to house the doctor blade 331 and shear edge assembly 329. It may be desirable to provide recesses 340 on both sides of the downstream most section of the inlet 12 (see FIG. 3). The non-used recess 340 may be available for future use.

The recess 340 extends the length (see L in FIG. 1) of the rotary feeder housing 11 and may exist on both sides of the inlet 12. By placing the shear edge assembly 329 and attached doctor blade 331 within the recess 340, the doctor blade 331 is not in the line of flow of the chips 13 entering the rotary feeder 310. Chips 13 flow past the recess 340 where the shear edge assembly 329 and doctor blade 331 reside. It is hypothesized that because the shear edge assembly 329 and doctor blade 331 are out of the inlet 12 of the rotary feeder 310, the chips 13 flow relatively uncut from the inlet 12 into pockets 20 (as shown in FIG. 2).

Additionally, the shear edge assembly 329 with attached doctor blade 331 located in the recess 340 provides protection of the rotor 15 outer surface 64 and the rotary feeder housing 11 inner surface 47 from damage. Damage to the rotor 15 outer surface 64 and the rotary feeder housing 11 inner surface 47 can occur when chips 13 become lodged in the radial clearance 322, especially if rocks, dirt, etc. are included in the chips 13.

Shear edge 329 and doctor blade 331 can be fastened to the rotary feeder housing 11 using a removable fastener 330. A suitable fastener 330 may be a bolt, or screw threaded fastener and nut, weld, or other suitable fastener 330. The fastener 330 passes through the doctor blade 331, the shear edge assembly 329 and the rotary feeder housing 11.

Should a shear edge assembly 329 or doctor blade 331 become damaged, either or both can be removed by removing the fastener 330 and replaced. If the shear edge assembly 329 comprises multiple shear edge plates 333, a single shear edge plate 333 may be removed and the doctor blade 331 may be positioned adjacent the remaining shear edge plate(s) 333.

Figure 4:
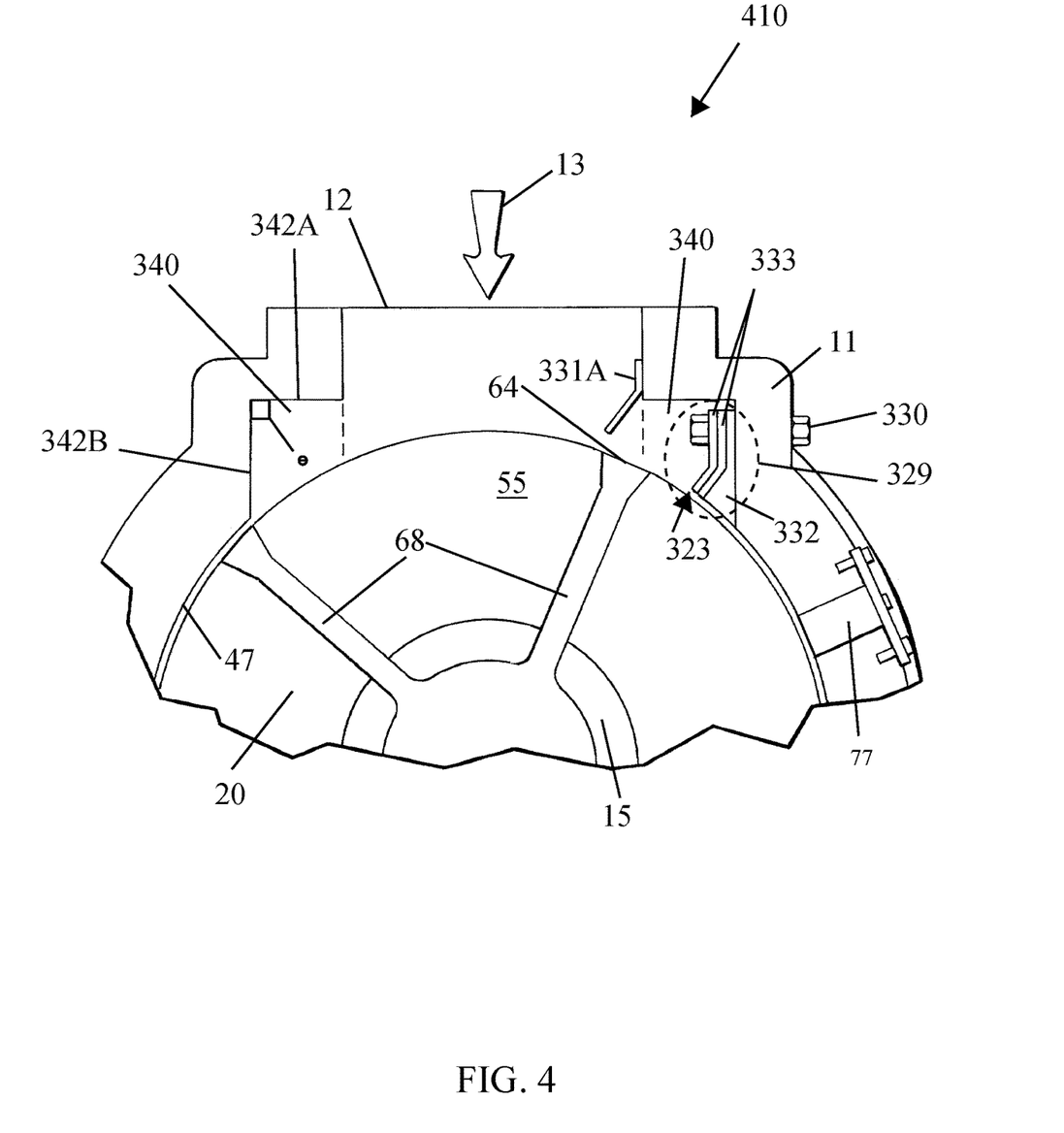
FIG. 4 is a schematic cross sectional view of a rotary feeder in accordance with an exemplary embodiment of the invention.

FIG. 4 is a schematic cross sectional view of a rotary feeder 410 in accordance with an embodiment of the invention. Chips 13 enter the inlet 12 of the rotary feeder 410. An inner wall 342 of the rotary feeder housing 11 defines the recess 340. The inner wall 342 may be curved in exemplary embodiments. A recess 340 has been formed in the rotary feeder housing 11. The recess 340 appears as a "notch" in the rotary feeder housing 11 and is of sufficient size to allow the shear edge assembly 329 to be inside the recess 340. Recess 340 may be provided on either side of the rotary feeder housing 11, either side of the inlet 12 at the downstream end of the inlet 12.

As in other embodiments, a shear edge assembly 329 may be located within the recess 340. The shear edge assembly 329 may be a single shear edge plate 333 or may be multiple shear edge plates 333 stacked against each other. The shear edge plates 333 may be adjacent a shear edge block 332, which together with shear edge plates 333 may comprise the shear edge assembly 329.

In this embodiment, a doctor blade 331A is attached to the internal surface of the rotary feeder housing 11 at a position within the inlet 12 just prior to the uppermost part of the recess 340. The doctor blade 331A may be attached to the rotary feeder housing 11 by a fastener 330 similar to the fastener 330 used to attach the shear edge assembly 329 to the rotary feeder housing 11. Usually, one recess 340 is used to house the shear edge assembly 329. As in other embodiments, it may be desirable to provide the recess 340 on both sides of the downstream most section of the inlet 12. The non-used recess 340 may be available for future use.

In this embodiment, the doctor blade 331A is located in the line of flow of the chips 13 entering the rotary feeder 410. The recess 340 extends the length of the rotary feeder housing 11 and may exist on both sides of the inlet 12. By locating the shear edge assembly 329 within the recess 340, the shear edge assembly 329 is not in the line of flow of the chips 13 entering the rotary feeder 410.

In this embodiment, the doctor blade 331A may be fastened to the internal surface of rotary feeder housing 11. The fastener 330 may be any suitable fastening device, including welding or a readily removable fastener such as a bolt or other screw threaded fastener and cooperates with internally treaded bores.

An exemplary rotary feeder assembly may comprise: a rotary feeder housing having an internal surface defining an inlet and an inner wall defining a recess at an exit end of the inlet, wherein the recess communicates with the exit end of the inlet; a shear edge assembly comprising a shear edge block, wherein the shear edge assembly has a front side and a back side, wherein the back side of the shear edge assembly engages the inner wall of the rotary feeder housing and the front side of the shear edge assembly comprises a tip extending outwardly from the front side toward an outer surface of a rotor blade, and wherein the tip does not extend into the inlet.

In an exemplary embodiment, the inner wall defining the recess may be a portion of the internal surface of the rotary feeder housing. In a further exemplary embodiment, the inner wall may further comprise a top inner wall and a first inner side wall adjacent to the top inner wall. The first inner side wall may be disposed at a right angle to the top inner wall.

A method has been conceived of retrofitting a rotary feeder housing to add a recess. The method includes removing a rotor from a rotary feeder housing. Cutting a side wall in the rotary feeder housing such that the side wall defines a recess. Adding a shear edge assembly to the recess, wherein the shear edge assembly has a front side and a back side, wherein the back side is attached to the side wall defining the recess, wherein the front side of the shear edge assembly has a tip extending outwardly toward a radial clearance defined by an outer surface of the rotor and an internal surface of the rotary feeder housing, and wherein the tip neither extends into the radial clearance nor into an inlet in the rotary feeder housing.

The recess is cut into the existing rotary feeder housing when the rotary feeder is deactivated. Once the rotary feeder is deactivated, the rotor may be removed from the rotary feeder. The recess is formed by making precise cuts into the existing rotary feeder housing. Maintenance or refurbishing personnel may precisely cut the rotary feeder housing with any suitable device or method, including plasma cutting, laser cutting, rotary tooling, or low heat input cutting or sawing, etc. Once the precise cuts are made in the rotary feeder housing, a cut material may be removed from the rotary feeder housing.

After cutting the rotary feeder housing and removing the cut material, to provide the recess, the shear edge assembly, which may comprise a shear edge block and multiple shear edge plates, and doctor blade can be positioned and attached to the housing within the recess. In other exemplary embodiments it is possible to position and attach only the shear edge assembly or the doctor blade in the recess.

According to one exemplary aspect of the invention, a comminuted cellulosic fibrous material rotary feeder apparatus may comprise: a rotary feeder housing, having an inlet opening configured to receive comminuted cellulosic fibrous material and a discharge outlet configured to discharge comminuted cellulosic fibrous material. A rotor, rotatably mounted with the rotary feeder housing, the rotor having radially extending rotor blades defining a plurality of pockets between the rotor blades, wherein each pocket is configured to accept comminuted cellulosic fibrous material introduced to the rotary feeder housing. The rotary feeder housing has an inner wall defining a recess along a length of the rotor at an exit end of the inlet. A shear edge assembly comprising a shear edge block is disposed within the recess such that a back of the shear edge assembly engages the inner wall of the rotary feeder housing and a front of the shear edge assembly does not extend beyond the recess.

According to another exemplary embodiment of the present invention, a method of treating comminuted cellulosic fibrous material utilizing a rotary feeder having a rotor with a plurality of pockets rotatable within a cylindrical housing with an inlet and an outlet, a radial clearance between the inside surface of the housing and the outside surface of the rotor, and a recess along the length of the rotor in the inlet at an exit end of the inlet, the recess being of sufficient size to allow a shear edge and doctor blade to sit within the recess.

The method of treating comminuted cellulosic fibrous material utilizing a rotary feeder comprises the steps of: (a) Feeding comminuted cellulosic fibrous material into an inlet of the rotary feeder housing having pockets for accepting comminuted cellulosic fibrous material introduced to the rotary feeder housing and past a recess of the rotary feeder housing at the exit end of the inlet. (b) Rotating the pockets within the rotary feeder housing to accept comminuted cellulosic fibrous material from the inlet and to carry the comminuted cellulosic fibrous material past the recess to a discharge outlet. (c) Discharging the comminuted cellulosic fibrous material from the pockets within the rotary feeder housing through the discharge outlet. (d) Placing a shear edge assembly within the recess. (e) When the tip of the shear edge assembly or the doctor blade is worn to approximately the point that excess leakage occurs or is substantially imminent, replacing a component of the shear edge assembly while interrupting the practice of steps (a)-(c); and (f) repeating steps (a) through (e). When the shear edge assembly is held in place by fasteners, and step (e) may be practiced by removing the fasteners, removing the shear edge assembly which is held in place by the fasteners, replacing the shear edge assembly, and holding the replaced shear edge assembly in place with the fasteners.

In one exemplary embodiment of the rotary feeder apparatus, wherein a doctor blade may be disposed on the front of the shear edge assembly, both the shear edge assembly and the doctor blade are positioned within the recess. The shear edge assembly and doctor blade may be held in place by readily removable fasteners (such as screw threaded fasteners). The fasteners engage the shear edge assembly and doctor blade to the inner wall of the rotary feeder housing. The readily removable fastener may be a bolt having threads and cooperating with internal thread bores in the rotary feeder housing.

In another exemplary embodiment of the rotary feeder apparatus, only a shear edge assembly is positioned within the recess. The shear edge assembly may be held in place by readily removable fasteners (such as screw threaded fasteners). If the doctor blade is not located within the recess, the doctor blade may be located at the exit end of the inlet just prior to the recess. In such cases, the doctor blade may be held in place by a removable fastener.

In at least some exemplary embodiments, the rotary feeder housing is a cast piece. The cast piece may be made using a cast mold. Integral to the casting mold is the recess. A recess may exist on each side of the inlet opening.

In other exemplary embodiments, the rotary feeder apparatus has had the recess made by cutting a recess in the rotary feeder housing. The cut recess is the length of the rotary feeder housing. In some cases, a recess may be cut on each side of the inlet opening.

In some embodiments, the shear edge assembly, comprised of a shear edge plate or multiple shear edge plates adjacent a shear edge block, or the doctor blade are held in place by fasteners (such as a screw threaded fastener or bolt), step (e) may be practiced by removing the fasteners, removing the at least one of the shear edge assembly or the doctor blade which are held on by the fasteners. Once removed, replacing the at least one of the shear edge plates or the entire shear edge assembly or the doctor blade, and holding the replaced at least one of the shear edge plate or entire shear edge assembly or the doctor blade in place with the fasteners. Where the fasteners are screw threaded and cooperate with nuts or internally threaded bores in the rotary feeder housing, step (e) is practiced by unscrewing the fasteners and then screwing the fasteners back into the threaded openings to reattach a new shear edge plate or shear edge assembly and doctor blade. Step (e) may also be practiced using a shear edge plate which has a shear edge with hardness properties of at least 10% (e.g. at least about 50%) greater than the hardness properties of the rotary feeder housing.

The method may be further practiced using a removable protective baffle (doctor blade) mounted to the rotary feeder housing inlet in a position adjacent the shear edge assembly, configured to shield the shear edge assembly from falling comminuted cellulosic fibrous material and wherein the method further comprises replacing a worn doctor blade with a new doctor blade. In that case there are the further steps of (g) readily removing the protective baffle (doctor blade) prior to replacing the shear edge assembly (e.g. by detaching and replacing the shear edge plate), and (h) after replacing the shear edge plate or shear edge assembly, reinstalling a protective baffle (doctor blade). The protective baffle (doctor blade) may be held in place by screw threaded fasteners or other suitable fasteners extending into and through the rotary feeder housing. If a screw threaded fastener is used, steps (g) and (h) are practiced by unscrewing the screw threaded fasteners holding the protective baffle (doctor blade) in place, and re-screwing the fasteners back into place once the shear edge assembly has been replaced; and positioning the protective baffle (doctor blade) so that it engages the shear edge plate or shear edge assembly.

According to yet another aspect of the invention, a rotary feeder is provided comprising: a housing having an interior and an inlet and outlet cooperating with the interior. A rotor mounted in the interior and rotatable in a direction of rotation with respect to the housing. The rotor having multiple pockets so that each pocket of the rotor, rotates from a position in communication with the inlet to a position in communication with the outlet. The rotor and housing interior having a radial clearance there between. A recess of the rotary feeder housing is positioned on a side of the rotary feeder housing at an exit end of the inlet. A shear edge assembly disposed inside the recess and adjacent the radial clearance in the exit end of the inlet, in the direction of rotation. The shear edge assembly comprising a shear block is mounted to the interior surface of the rotary feeder housing so that the shear edge assembly is configured to be replaced.

In some exemplary embodiments, the shear edge assembly is comprised of multiple shear edge plates. When the shear edge assembly is comprised of multiple shear edge plates, the shear edge plates are stacked adjacent each other to form a shear edge assembly. The shear edge assembly may be attached to the rotary feeder housing by a replaceable fastener. As a shear edge plate becomes worn, a single shear edge plate may be removed from the stack of shear edge plates and, if present the protective baffle (doctor blade), leaving in position the remaining shear edge plates. When all of the shear edge plates have become worn, a new shear edge assembly (comprising a shear edge block or a combination of a shear edge block and shear edge plates) may be installed using the same or new fasteners.

In some exemplary embodiments, the doctor blade may be attached to the rotary feeder housing, either within the recess (along with the shear edge assembly) or just outside the recess by a readily replaceable fastener. When the doctor blade is worn, the doctor blade may be removed from the rotary feeder housing and may be replaced with a new doctor blade. In at least some embodiments, no doctor blade is present.

The invention also relates to a method of refurbishing or retrofitting the rotary feeder in a pulp mill, the rotary feeder having cylindrical rotary feeder housing with inlet and outlet. A rotor is disposed within the rotary feeder housing and having a radial clearance with respect thereto, and rotatable about an axis within the rotary feeder housing. A recess of the rotary feeder housing at the exit end of the inlet. A shear edge assembly and protective baffle (doctor blade) disposed inside the recess and adjacent the radial clearance in the downstream most portion of the inlet, in the direction of rotation.

The method of refurbishing comprises the steps of: (a) Stopping rotation of the rotor. (b) Cutting out the shear edge and protective baffle (doctor blade). (c) Forming a recess in the rotary feeder housing. (d) Installing a shear edge assembly and protective baffle (doctor blade) in the recess. (e) Fastening the shear edge assembly and protective baffle (doctor blade) to the rotary feeder housing with fasteners extending into the fastener receiving openings in the shear edge assembly and protective baffle (doctor blade) and through the rotary feeder housing inside surface through to the rotary feeder housing outside surface. And (f) restarting operation of the rotary feeder.

Step (d) may be practiced by having multiple shear edge plates stacked on a shear edge block to form a shear edge assembly. There may be the further step (g) of when the outermost shear edge plate or the shear edge block becomes worn, loosening the fasteners, replacing the shear edge plate or shear edge block (such as by sliding the shear edge plate or shear edge block substantially radially with respect to the radial clearance/rotor), and tightening the fasteners.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed:

1. A comminuted cellulosic fibrous material rotary feeder apparatus comprising:
    a rotary feeder housing, having an inlet configured to receive a comminuted cellulosic fibrous material and to convey the comminuted cellulosic fibrous material to a pocket of a rotor disposed below the inlet, and a discharge outlet configured to discharge comminuted cellulosic fibrous material, wherein an inner wall of the rotary feeder housing defines a recess; and
    a shear edge assembly disposed within the recess, the shear edge assembly comprising a shear edge plate having a tip configured to shear the comminuted cellulosic fibrous material when the tip is exposed to the comminuted cellulosic fibrous material, wherein the tip of the shear edge assembly is disposed in the recess such that the tip of the shear edge assembly does not extend beyond the recess into the inlet such that the tip of the shear edge assembly is not in line with the flow of comminuted cellulosic fibrous material entering the pocket of the rotor through the inlet.

2. The rotary feeder apparatus of claim 1 further comprising a doctor blade disposed on a front of the shear edge assembly, wherein the doctor blade is positioned within the recess such that the doctor blade does not extend into the inlet.

3. The rotary feeder of claim 2, wherein a fastener engages the shear edge assembly and doctor blade to the inner wall of the rotary feeder housing.

4. The rotary feeder apparatus of claim 1 further comprising a doctor blade, the doctor blade being disposed at the exit end of the inlet prior to the recess.

5. The rotary feeder apparatus of claim 4 wherein the doctor blade is held in place by a fastener.

6. The rotary feeder apparatus of claim 1 wherein the rotary feeder housing is a cast piece made using a casting mold wherein the recess is part of the casting mold.

7. The rotary feeder apparatus of claim 6 wherein the recess is present on each side of the inlet.

8. The rotary feeder apparatus of claim 1 wherein the recess is made by cutting a recess in the rotary feeder housing.

9. The rotary feeder apparatus of claim 8, wherein the recess is cut on each side of the inlet.

10. The apparatus of claim 1 further comprising a rotor rotatably mounted within the rotary feeder housing, the rotor having radially extending rotor blades defining a plurality of pockets between the rotor blades, wherein each pocket is configured to accept comminuted cellulosic fibrous material introduced to the rotary feeder housing.

11. The rotary feeder apparatus of claim 1, wherein the shear edge assembly further comprises multiple shear edge plates stacked adjacent each other which, when worn are each configured to be removed while leaving adjacent shear edge plates in place.

12. A rotary feeder assembly comprising:
 a rotary feeder housing having an internal surface defining an inlet configured to convey a comminuted cellulosic fibrous material to a pocket of a rotor disposed below the inlet; and
 an inner wall defining a recess in the inner wall above a rotor; and
 a shear edge assembly disposed within the recess, the shear edge assembly comprising a shear edge plate having a tip configured to shear the comminuted cellulosic fibrous material, wherein the tip of the shear edge assembly is disposed in the recess such that the tip of the shear edge assembly does not extend beyond the recess into the inlet such that the tip of the shear edge assembly is not in line with the flow of comminuted cellulosic fibrous material entering the pocket of the rotor through the inlet.

13. The rotary feeder apparatus of claim 12 wherein the shear edge assembly further comprises multiple shear edge plates stacked adjacent each other which when worn are each configured to be removed while leaving adjacent shear edge plates in place.

14. The apparatus of claim 12 further comprising a rotor rotatably mounted within the rotary feeder housing, the rotor having radially extending rotor blades defining a plurality of pockets between the rotor blades, wherein each pocket is configured to accept comminuted cellulosic fibrous material introduced to the rotary feeder housing.

* * * * *